United States Patent
Nonnenmacher et al.

(10) Patent No.: US 11,198,373 B2
(45) Date of Patent: Dec. 14, 2021

(54) METHOD FOR OPERATING A CHARGING DEVICE

(71) Applicant: Robert Bosch GmbH, Stuttgart (DE)

(72) Inventors: Achim Nonnenmacher, Stuttgart (DE); Helmut Randoll, Vaihingen (DE); Holger Leege, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 121 days.

(21) Appl. No.: 16/625,818

(22) PCT Filed: May 3, 2018

(86) PCT No.: PCT/EP2018/061325
§ 371 (c)(1),
(2) Date: Dec. 23, 2019

(87) PCT Pub. No.: WO2018/233918
PCT Pub. Date: Dec. 27, 2018

(65) Prior Publication Data
US 2020/0122595 A1    Apr. 23, 2020

(30) Foreign Application Priority Data

Jun. 22, 2017 (DE) .................... 10 2017 210 566.6

(51) Int. Cl.
| | |
|---|---|
| *H02J 7/00* | (2006.01) |
| *B60L 53/57* | (2019.01) |
| *B60L 53/66* | (2019.01) |
| *B60L 53/65* | (2019.01) |
| *G06Q 10/06* | (2012.01) |
| *G06Q 50/06* | (2012.01) |

(Continued)

(52) U.S. Cl.
CPC ............... *B60L 53/57* (2019.02); *B60L 50/64* (2019.02); *B60L 53/65* (2019.02); *B60L 53/66* (2019.02);

(Continued)

(58) Field of Classification Search
None
See application file for complete search history.

(56) References Cited

U.S. PATENT DOCUMENTS

| | | | |
|---|---|---|---|
| 8,498,763 B2 * | 7/2013 | Hafner | .................... B60L 53/64 |
| | | | 701/22 |
| 9,290,104 B2 * | 3/2016 | Gadh | .................. B60L 11/1838 |

(Continued)

FOREIGN PATENT DOCUMENTS

| | | |
|---|---|---|
| CN | 104638694 A | 5/2015 |
| DE | 102009028565 | 2/2011 |

(Continued)

OTHER PUBLICATIONS

International Search Report for Application No. PCT/EP2018/061325 dated Aug. 27, 2018 (English Translation, 2 pages).

*Primary Examiner* — Arun C Williams
(74) *Attorney, Agent, or Firm* — Michael Best & Friedrich LLP

(57) ABSTRACT

The present invention relates to a method for operating a charging device for charging energy stores of vehicles, preferably electric vehicles or hybrid vehicles, wherein the charging device is connected to an Internet-enabled server. In a method step, at least one receiver vehicle with a flat or partially charged battery communicates its charging demand to the charging device. Furthermore, in a method step at least one donor vehicle with an at least partially charged battery communicates its readiness to charge to the charging device.

11 Claims, 1 Drawing Sheet

(51) Int. Cl.
*G08G 1/0965* (2006.01)
*G08G 1/123* (2006.01)
*B60L 50/64* (2019.01)

(52) U.S. Cl.
CPC ....... *G06Q 10/06315* (2013.01); *G06Q 50/06* (2013.01); *G08G 1/0965* (2013.01); *G08G 1/123* (2013.01); *H02J 7/00034* (2020.01); *B60L 2240/70* (2013.01)

(56) References Cited

U.S. PATENT DOCUMENTS

| | | | |
|---|---|---|---|
| 9,989,373 B2* | 6/2018 | Uyeki | ................ G01C 21/3469 |
| 2012/0109409 A1 | 5/2012 | Hara | |
| 2012/0271758 A1* | 10/2012 | Jammer | ................ G07F 15/005 |
| | | | 705/39 |
| 2014/0188699 A1* | 7/2014 | Langgood | ............... B60L 58/12 |
| | | | 705/39 |
| 2016/0129793 A1 | 5/2016 | Cronie | |
| 2017/0136890 A1 | 5/2017 | Ricci | |

FOREIGN PATENT DOCUMENTS

| | | |
|---|---|---|
| DE | 102011010049 | 11/2011 |
| JP | 2012108870 A | 6/2012 |
| JP | 2012200043 A | 10/2012 |
| JP | 2013033403 A | 2/2013 |
| JP | 2013130963 A | 7/2013 |
| JP | 2014212690 A | 11/2014 |

* cited by examiner

METHOD FOR OPERATING A CHARGING DEVICE

BACKGROUND OF THE INVENTION

The present invention relates to a method for operating a charging device.

Electric vehicles normally have an electrical energy store, for example a traction battery, that provides the electric energy for the drive. If this electrical energy store is fully or partly discharged, then the electric vehicle has to actuate a charging station at which the energy store is able to be recharged. At present, the normal procedure for this is to connect the electric vehicle, at such a charging station, to the charging station by way of a wired connection. This connection disadvantageously normally has to be established manually by a user. In this case, it is also necessary for the charging station and the electric vehicle to have a mutually corresponding connection system.

In some isolated cases, wireless charging systems for electric vehicles are furthermore also known. In the case of the inductive charging of electric vehicles, one or more coils (transmission coils) are installed in or on the ground. One or more coils (reception coils) are furthermore likewise arranged in the electric vehicle. If an electric vehicle is parked above the transmission coil, this transmission coil emits a magnetic alternating field. The magnetic alternating field is received by the reception coil inside the vehicle and converted into electrical energy. A traction battery of the vehicle is then able to be charged by way of this electrical energy through the contactless transfer of energy. The energy store of the electric vehicle may furthermore also be used for feedback purposes. For this purpose, a wired connection or else an inductive power transfer may possibly be used.

Document DE102011010049 A1 discloses such a system for charging a vehicle battery in which the energy is transferred inductively. The prior art is disadvantageous in that both wired and wireless charging methods are used only to charge traction batteries of the respective vehicle. Some methods contain additional functionalities, such as for example billing methods, by way of which the driver is billed for the amount of charge supplied to the battery. The prior art is also disadvantageous in that vehicles are able to be charged either only in a wired manner or inductively by locally fixedly installed charging stations that need to be driven to selectively by the driver. If however a vehicle is immobilized due to an empty traction battery, it is no longer capable of driving to a charging station and charging the battery. Under some circumstances, it would have to be towed away.

It should be assumed that, with the increasing spread of electromobility, in a few years' time, several million vehicles with empty batteries will be immobilized across the world per year. This estimation is based on studies by the ADAC [Allgemeiner Deutscher Automobil-Club, a German motoring association] which forecast that roughly a quarter of a million vehicles are immobilized without fuel per year in Germany alone. It is accordingly able to be assumed that a similar number will also arise in the case of electric cars.

There is therefore a need for a method by way of which it is possible to dispense with towing away a vehicle with an empty battery.

SUMMARY OF THE INVENTION

The method according to the invention has the advantage that it is not necessary to tow away a vehicle with an empty traction battery.

According to the invention, what is provided for this purpose is a method for operating a charging device for charging energy stores of vehicles, preferably electric or hybrid vehicles, wherein the charging device is connected to an Internet-enabled server. At least one receiver vehicle with an empty or partly charged battery communicates its charging requirement to the charging device in one method step. At least one donor vehicle with an at least partly charged battery furthermore communicates its willingness to charge to the charging device in one method step. The method makes it possible, in the event of an empty battery of a receiver vehicle (immobilized vehicle with empty battery or vehicle with partly charged battery that is no longer expected to reach the next or desired charging station), to quickly find any desired donor vehicle that has an at least partly charged battery and is thus able to transfer a portion of its battery charge to the receiver vehicle. Any electric or hybrid vehicle can accordingly act as a "breakdown service", as it were. This is additionally advantageous in that the number of privately used vehicles greatly exceeds the number of available breakdown service vehicles in everyday road traffic. An immobilized receiver vehicle accordingly receives assistance far more quickly than if it has to wait for example for a professional breakdown service, in which waiting times are in some cases at least 45 minutes.

The measures cited in the dependent claims enable advantageous developments of the method specified in the independent claim.

The receiver vehicle and/or the donor vehicle advantageously communicates with the Internet-enabled server of the charging device via the Internet. Electric and hybrid vehicles nowadays have an Internet connection and are thus capable of communicating not only with the Internet per se but also with one another. Accordingly, both the charging requirement and the willingness to charge are able to be communicated to the Internet-enabled server using an Internet connection. The networking of the individual vehicles with one another thus creates a "connected service", wherein the charging device according to the invention enables the mutual connection.

As an alternative to connecting donor and receiver vehicles via a server, the connection may also be created directly between the vehicles by way of vehicle-to-vehicle communication, vehicle-to-infrastructure communication, via an additional server (for example additional server of a breakdown service provider that in turn exchanges the information with its breakdown service fleet vehicles) or by way of a decentralized network, such as for example by using blockchain technology.

The Internet-enabled server advantageously has a cloud service, a cloud or cloud computing. As a result, the IT infrastructure is advantageously made available via the Internet-enabled server to the charging device without this having to be installed in a manner present in the respective receiver vehicle or donor vehicle. Accordingly, the cloud allows inter alia cost advantages in comparison with conventional systems. When using cloud services, the used capacity is able to be adjusted variably in the short term to the actual requirement. This applies in particular in commercial fields that urgently have to meet external requirements, such as for example logistics, as is the case in the method according to the invention. Constantly fluctuating volumes such as the varying number of immobilized vehicles require prompt reaction and continuous availability of the capacities required for execution. By virtue of the flexibility and the scalability of the cloud, providing required resources for logistical software would be considerably cheaper and easier to implement than is currently the case with static systems.

It is furthermore advantageous that both the receiver vehicle and the donor vehicle transmit their position to the charging device. The receiver vehicle and the donor vehicle have GPS and are thus able to locate their position. This position is transmitted to the charging device with the assistance of the Internet-enabled server. The charging device accordingly knows the positions of the receiver and donor vehicles and is able to select the closest positioned donor vehicle to drive to the receiver vehicle.

The receiver vehicle and the donor vehicle advantageously transmit the charging capability to the charging device. The charging capability transmission includes information such as for example the plug type of the respective vehicles. This helps when selecting the donor vehicle suitable for the receiver vehicle. Only vehicles that are compatible with one another are "paired"—that is to say selected for mutual charging—these thus also being able to provide suitable plug types.

The receiver vehicle and the donor vehicle furthermore transmit the manufacturer or vehicle type to the charging device. Electric vehicles have different characteristics depending on the manufacturer or vehicle type. By way of example, the high voltage (AC/DC) that the vehicle is able to output may turn out to be different depending on the vehicle, which restricts the compatibility of the receiver vehicle and of the donor vehicle.

In order to make it possible to select suitable vehicles with regard to the mutual charging process, further information is required for the charging device regarding coordination. The receiver vehicle and the donor vehicle accordingly transmit the maximum possible charge current to the charging device. It is thereby possible for the charging device both to select compatible vehicles and to estimate charging times and to transmit these to the drivers of the vehicles.

The additional amount of energy that is required in order that the receiver vehicle is able to reach its destination or the next suitable charging station is additionally estimated in the receiver vehicle. This information is transmitted to the donor vehicle by the charging device, and the additional information from the receiver vehicle (GPS position, destination, state of charge, expected energy consumption) is used to estimate whether the amount of energy still present in the donor vehicle is sufficient to charge the receiver vehicle sufficiently and furthermore still to reach the actual navigation destination.

In order to keep the servicing time for the driver of the receiver vehicle as short as possible or to likewise keep the travel time of the donor vehicle to a minimum, the charging device advantageously determines the distance between the receiver vehicle and the donor vehicle from the transmitted information from the receiver vehicle and the donor vehicle.

If the donor vehicle and the receiver vehicle have transmitted the required information (current position by GPS, required charge, charging capability of the vehicle, plug type, maximum charge current, manufacturer, vehicle type, current type (DC or AC voltage), etc.) to the charging device, the charging device determines the compatibility of the receiver vehicle and the donor vehicle from this transmitted information.

Following a suitable selection of appropriate receiver and donor vehicles, the charging device establishes the contact between a suitable receiver vehicle and donor vehicle. The vehicles are thus networked with the cloud or the cloud service, but may also be networked by way of vehicle-to-vehicle communication or decentralized networks (for example blockchain).

Further features and advantages of the present invention become apparent to a person skilled in the art from the following description of exemplary embodiments, which should however not be interpreted as restricting the invention, with reference to the appended drawings.

BRIEF DESCRIPTION OF THE DRAWINGS

In the figures.

The drawings illustrated in the figures are not necessarily depicted true to scale for the sake of clarity. Identical reference signs generally denote identical or functionally identical components.

DETAILED DESCRIPTION

Figure 1:
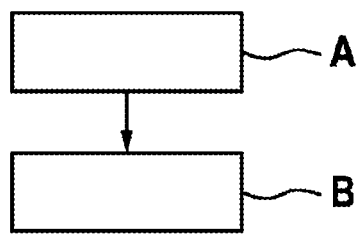
FIG. 1: shows a schematic diagram of the method according to the invention.

FIG. 1 shows a schematic illustration of the method according to the invention for operating a charging device 10 for charging energy stores 12 of vehicles 13, preferably electric or hybrid vehicles. The charging device 10 is connected to an Internet-enabled server 14. In a method step A, a receiver vehicle 15 with an empty (or partly charged) battery 17 communicates its charging requirement to the charging device 10. In a method step B, a donor vehicle 16 with an at least partly charged battery 18 communicates its willingness to charge to the charging device 10.

Figure 2:
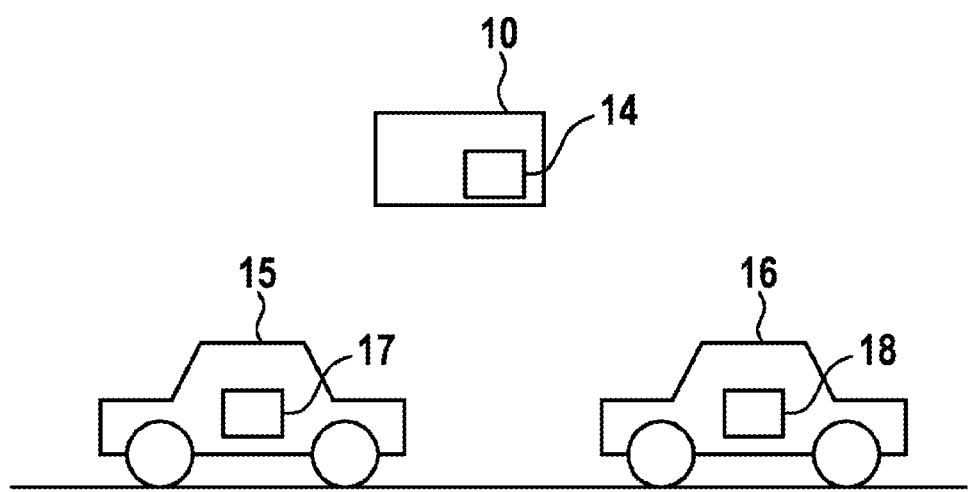
FIG. 2: shows a schematic illustration of a donor vehicle and of a receiver vehicle.

FIG. 2 shows a schematic illustration of a donor vehicle and of a receiver vehicle. Identical elements with regard to FIG. 1 are provided with the same reference signs and are not explained in more detail. If a vehicle 13, 15, for example a hybrid or an electric vehicle with an empty battery 12, 17, is immobilized, the present invention is intended to allow this "receiver vehicle" to find a vehicle 13 or donor vehicle 16 that is able to transfer and thus donate a portion of its charge from its at least partly still charged battery 18 to the receiver vehicle. If a receiver vehicle 15 is immobilized, it communicates with a charging device 10. This charging device has an Internet-enabled server 14 and has a cloud (cloud services, cloud computing, connected service). The service running in the charging device 10 consists in principle of the following components: The receiver vehicle with an empty (or partly charged) battery communicates the charging requirement via the charging device/the cloud. The receiver vehicle may for this purpose itself be Internet-enabled or, as an alternative, the smartphone of the driver may be used. Possible donor vehicles likewise communicate their charging capability or willingness to charge to the charging device 10 in parallel. The information about the vehicles and available to the charging device 10 is used, in the charging device/the cloud, to identify and bring together mutually compatible vehicles. For this purpose, the charging device assists with the navigation of the donor vehicle to the receiver vehicle.

If the receiver vehicle 15 with an empty (or partly charged) battery contacts the charging device 10, it may in the process use a "connectivity module" of the vehicle. This optionally establishes an Internet connection to the charging device 10. As an alternative, the receiver vehicle 15 may also contact the donor vehicle 16 directly via the connectivity module. If contact has been established with the charging device 10, the receiver vehicle transmits information to the charging device. This includes inter alia information about the current position (for example GPS coordinates), required charge, charging capability of the vehicle (plug type, maximum possible charge current), manufacturer, vehicle type, etc. In the same way, possible donor vehicles are likewise connected to the charging device 10 and likewise transmit required information, such as for example information about the current position (for example GPS coordinates), state of charge, charging capability of the vehicle (adapter or plug type, maximum possible charge current), manufacturer, vehicle type, current type (DC or AC voltage).

Using boundary conditions that have to be met, such as distance between the vehicles, sufficient state of charge of the donor vehicle 16 or compatibility of the vehicles with one another, for example voltage or adapters/plugs, an algorithm in the cloud or the vehicle 15 calculates possible pairings of donor and receiver vehicles 16, 15. These suitable vehicles are connected/contacted via the cloud or vehicle-to-vehicle communication.

The charging requirement state of the receiver vehicle is then displayed in the correspondingly suitable donor vehicles 16, for example in the head-up display or on the map of the navigation system. Additional information such as for example diversion, required charging time, vehicle type (for a "branded community", for example drivers of the same vehicle manufacturer help one another) may likewise be displayed.

Drivers of the possible donor vehicles 16 are then able to select whether or not they would like to assist the receiver vehicle 15. If it is indicated that the receiver vehicle 15 should be assisted, then the current route in the navigation system is changed to the receiver vehicle 15 as destination, and the driver of the receiver vehicle is informed that assistance is on the way.

The service may be implemented both free of charge and at a cost, for example by being incorporated into a payment system. Both other drivers of electric vehicles/PHEVs and specialized vehicles, such as for example extra breakdown vehicles of a service provider provided for breakdown assistance, come into consideration as donor vehicles. The communication from the receiver vehicle to the breakdown assistance vehicle may also possibly take place via an additional server of the breakdown service provider.

The invention claimed is:

1. A method for operating a charging device (10) for charging energy stores (12) of vehicles (13) wherein the charging device (10) is connected to an Internet-enabled server (14), wherein at least one receiver vehicle (15) with an empty or at least partly charged battery (17) communicates its charging requirement to the charging device (10); and at least one donor vehicle (16) with an at least partly charged battery (18) communicates its willingness to charge, a maximum possible charge current, and plug type to the charging device (10).

2. The method for operating a charging device (10) as claimed in claim 1, wherein the receiver vehicle (15), the donor vehicle (16), or both communicate with the Internet-enabled server (14) of the charging device (10) via the Internet.

3. The method for operating a charging device (10) as claimed in claim 1, wherein the Internet-enabled server (14) has a cloud service (18).

4. The method for operating a charging device (10) as claimed in claim 1, wherein the receiver vehicle (15) and the donor vehicle (16) transmit their position to the charging device.

5. The method for operating a charging device (10) as claimed in claim 1, wherein the receiver vehicle (15) and the donor vehicle (16) transmit the charging capability to the charging device (10).

6. The method for operating a charging device (10) as claimed in claim 1, wherein the receiver vehicle (15) and the donor vehicle (16) transmit the manufacturer or vehicle type to the charging device.

7. The method for operating a charging device (10) as claimed in claim 1, wherein both the receiver vehicle (15) and the donor vehicle (16) transmit the maximum possible charge current to the charging device.

8. The method for operating a charging device (10) as claimed in claim 1, wherein the receiver vehicle (15) transmits the required amount of energy and the donor vehicle (16) transmits the maximum amount of energy to be donated to the charging device.

9. The method for operating a charging device (10) as claimed in claim 1, wherein the charging device (10) determines the distance between the receiver vehicle (15) and the donor vehicle (16) from the transmitted information from the receiver vehicle (15) and the donor vehicle (16).

10. The method for operating a charging device (10) as claimed in claim 1, wherein the charging device (10) determines the compatibility of the receiver vehicle (15) and the donor vehicle (16) from the transmitted information from the receiver vehicle (15) and the donor vehicle (16).

11. The method for operating a charging device (10) as claimed in claim 1, wherein the charging device (10) establishes the contact between a suitable receiver vehicle (15) and donor vehicle (16).

\* \* \* \* \*